March 23, 1965 V. H. CHATTEN 3,174,688

ORNAMENTAL DEVICE USING LIQUID DROPLETS

Filed Oct. 9, 1962 5 Sheets-Sheet 1

INVENTOR.
VICTOR H. CHATTEN
BY
Lyon & Lyon
ATTORNEYS

March 23, 1965 V. H. CHATTEN 3,174,688

ORNAMENTAL DEVICE USING LIQUID DROPLETS

Filed Oct. 9, 1962

5 Sheets-Sheet 2

INVENTOR.
VICTOR H. CHATTEN

BY Lyon & Lyon

ATTORNEYS

March 23, 1965 V. H. CHATTEN 3,174,688

ORNAMENTAL DEVICE USING LIQUID DROPLETS

Filed Oct. 9, 1962 5 Sheets-Sheet 3

INVENTOR.
VICTOR H. CHATTEN

BY Lyon & Lyon

ATTORNEYS

INVENTOR.
VICTOR H. CHATTEN
BY
Lyon & Lyon
ATTORNEYS

VICTOR H. CHATTEN
INVENTOR.

BY Lyon & Lyon
ATTORNEYS

United States Patent Office
3,174,688
Patented Mar. 23, 1965

3,174,688
ORNAMENTAL DEVICE USING LIQUID DROPLETS
Victor H. Chatten, 1567 W. 215th St., Torrance, Calif.
Filed Oct. 9, 1962, Ser. No. 229,340
21 Claims. (Cl. 239—20)

This invention relates to ornamental devices, and is particularly directed to such a device in which liquid droplets descend by gravity along the outer surface of a vertical or inclined line or wire.

It is the principal object of this invention to provide a novel form of ornamental device having a plurality of vertical or inclined wires or lines along which liquid droplets descend by gravity to produce an effect which is pleasing to the eye and which looks something like slowly falling rain.

Another object is to provide an ornamental device of this type which is particularly adapted to be employed in any one of a number of artistic designs and in which special ornamental effects may be achieved by means of one or more series of lines, each carrying liquid droplets descending by gravity.

Another object is to provide such an ornamental device in which the liquid from which the droplets are formed carries fluorescent material and wherein ultraviolet light is employed to illuminate the droplets as they descend.

Other and related objects and advantages will appear hereinafter.

Figure 27:
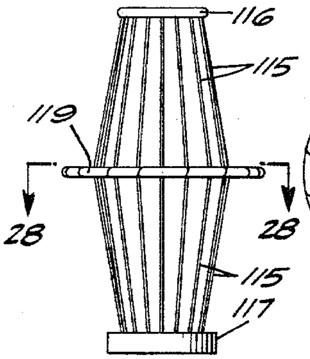
Figure 28:
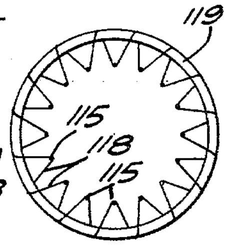
Figures 23, 25, 29, 30, 31:
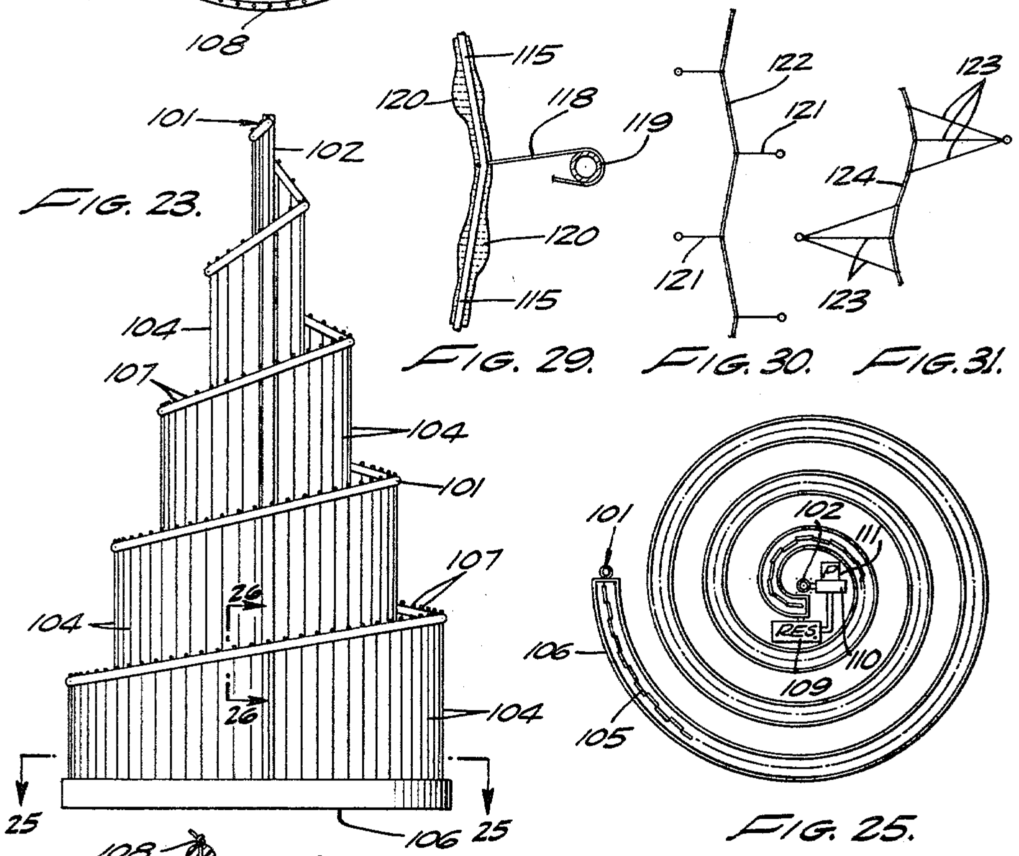
FIGURE 23 is a side elevation showing another modified form of the invention
FIGURE 25 is a plan view taken substantially on lines 25—25 as shown in FIGURE 23.
Figure 26:
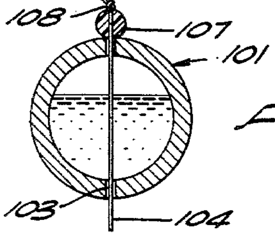
FIGURE 26 is a transverse sectional elevation taken substantially on lines 26—26 as shown in FIGURE 23.

FIGURE 27 is a side elevation showing another modification. FIGURE 28 is a sectional plan view taken substantially on line 28—28 as shown on FIGURE 27. FIGURES 29, 30 and 31 are side elevations in diagrammatic form showing how the inclination of the droplet-carrying lines may be changed by lateral guy wires of small diameter.

Figures 1, 2, 3:
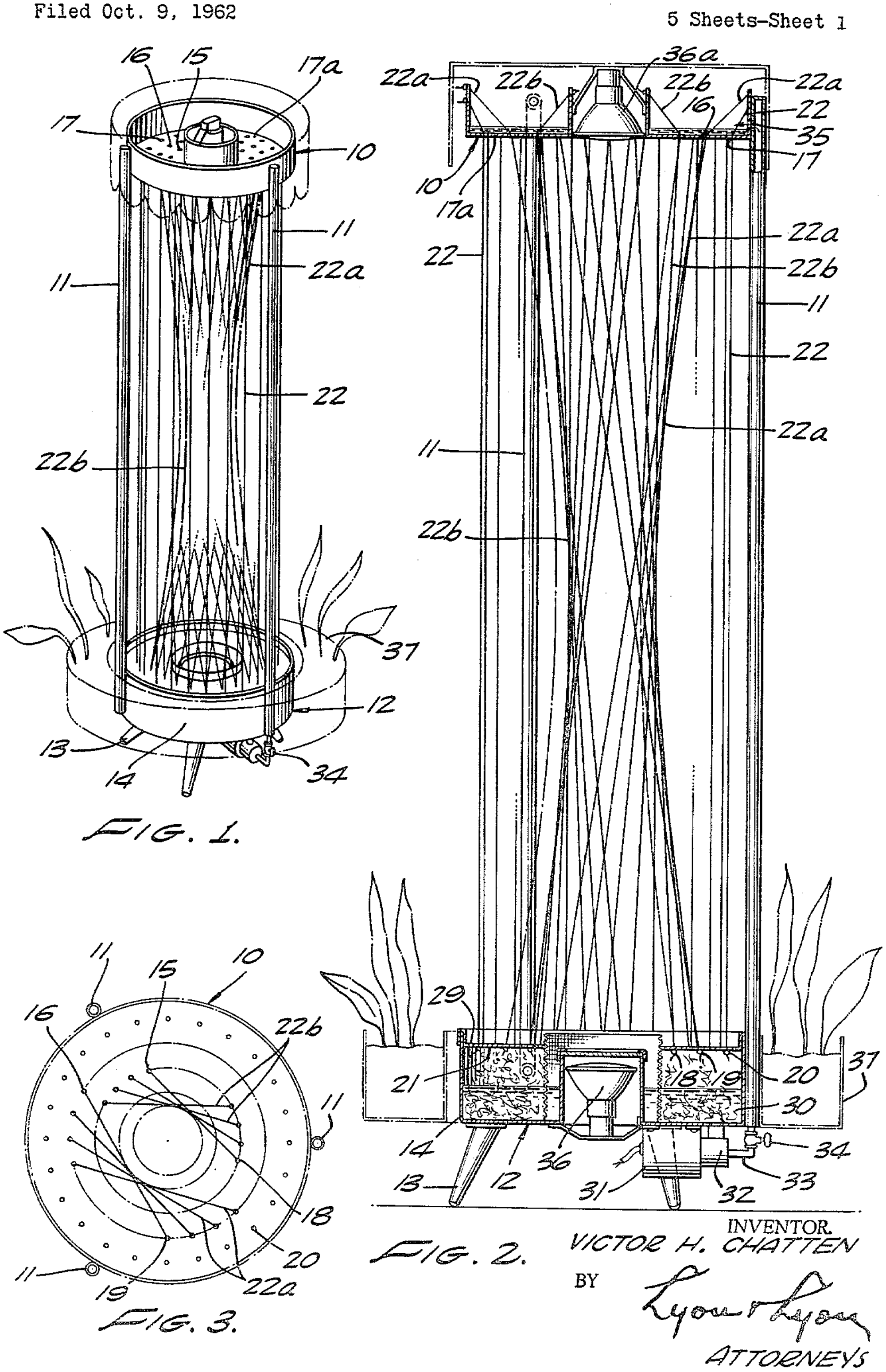
FIGURE 1 is a perspective view showing a preferred embodiment of this invention.
FIGURE 2 is a sectional elevation.
FIGURE 3 is a plan view constituting a schematic diagram showing how the individual lines are connected.

Referring to the drawings, the ornamental device shown in FIGURES 1, 2 and 3 includes a liquid distributor 10 in the form of an annular trough supported by a plurality of vertical tubes 11. The tubes are attached to a base 12 having supporting feet 13. The liquid collector 14 in the form of an annular trough is carried by the base 12 and is positioned directly below the liquid distributor 10. Three concentric series of holes 15, 16 and 17 are provided in the bottom wall 18 of the liquid distributor 10. Similarly three concentric series of holes 18, 19 and 20 are provided in the annular pan 21 of the collector 14.

A plurality of lines or wires extend from the distributor 10 to the collector 14 and these lines are each designated 22. The lines or wires have a smooth external surface and I prefer to use mono-filament nylon lines in the size range of approximately 0.030 to 0.090 inch diameter. The lines 22 in the outer series are vertical and extend through the holes 17 and 20 in the distributor 10 and collector 14 respectively. The lines in the second series extend through the holes 16 and 19 but these lines are not vertical and, on the contrary, extend at an angle in the same direction for forming an hour glass shape. This is diagrammatically illustrated in FIGURE 3 by the lines **22*a*. In a similar fashion the lines which connect the inner series of holes 15 in the liquid distributor 10 to the inner series of holes 18 in the collector 14 are straight but not parallel and each extends at an angle in the opposite direction (as compared to the lines 22*a*) to form a similar hour glass shape. These lines are shown at 22*b* in FIGURE 3. Thus the inner series of lines appears to have a spiral lead in one direction while the enclosing series of lines appears to have a spiral lead in the other direction. The lines 22** in the outer series are all vertical and appear to form an enclosing shell or sheath for the other two concentric hour glass shapes. The lines are all straight and none of them touches any other line.

Figures 12, 13, 14, 15, 16:
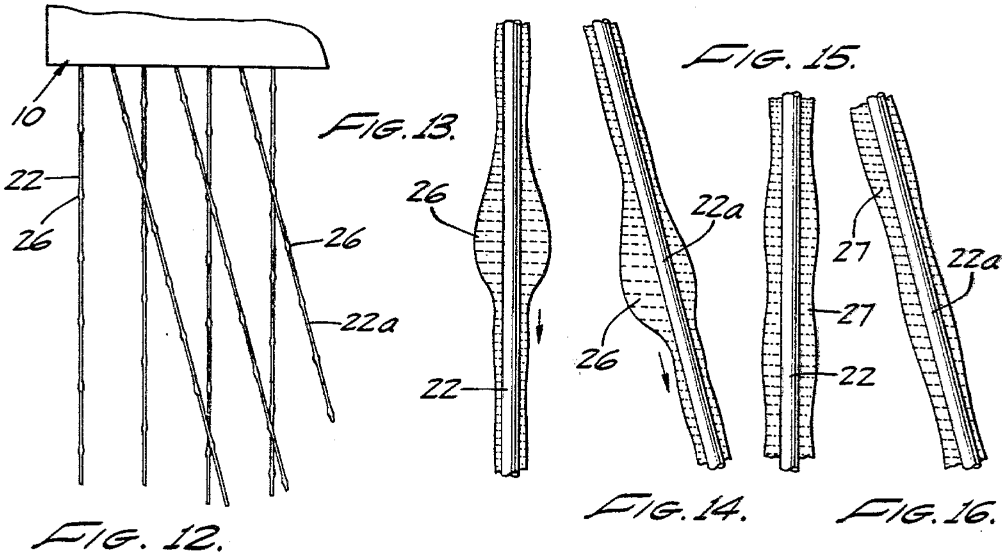
FIGURE 12 is a schematic diagram showing liquid droplets descending by gravity along vertical and inclined lines.
FIGURE 13 is a schematic diagram partly in section showing a single liquid droplet as it descends along a vertical line.
FIGURE 14 is a view similar to FIGURE 13, showing the droplet descending along an inclined line.
FIGURE 15 is a diagram partly in section showing liquid descending on a vertical line, but without the formation of pronounced droplets.
FIGURE 16 is a view similar to FIGURE 15 relating to an inclined wire or line.
Figures 17, 18, 19, 20:
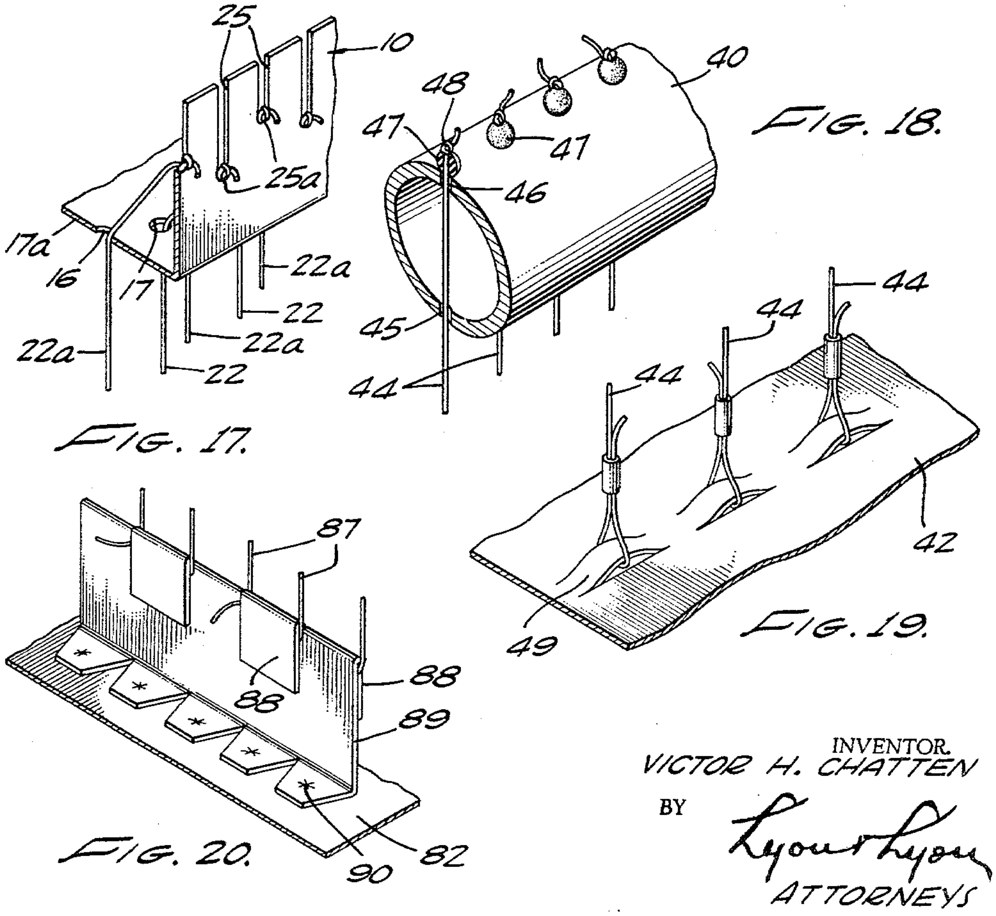
FIGURE 17 is a fragmentary detail, partly in section, showing one means of securing the upper ends of the lines to the distributor.
FIGURE 18 is a fragmentary detail, partly in section, showing another means of securing the upper ends of the lines to the distributor.
FIGURE 19 is a perspective view showing a preferred means of securing the lower ends of the line to the collector.
FIGURE 20 is a perspective view showing another means of securing the lower ends of the lines to the collector.
Figure 24:
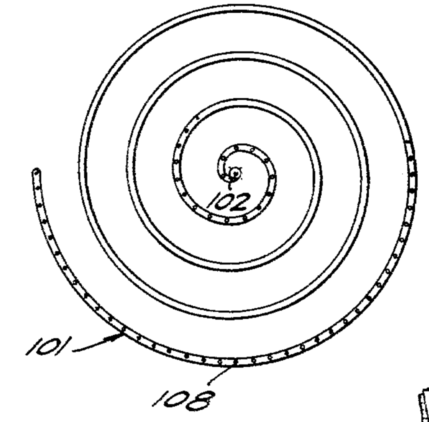
FIGURE 24 is a plan view thereof.

The diagram of FIGURE 17 shows a convenient means for anchoring the upper ends of the lines to the distributor 10. Thus each line may be passed through a slot 25 and provided with a knot 26 which is too large to pass through the slot. Each of the holes 15, 16 and 17 in the bottom wall 18 of the liquid distributor 10 is of larger diameter than the diameter of the line which passes through it. This provides clearance space within each hole and around each line through which liquid may pass from the interior of the liquid distributor 10 and descend as droplets along each of the lines. FIGURE 12 is a diagram showing this effect and FIGURES 13 and 14 are enlargements showing the general shape of the droplets 26 as they descend by gravity along a vertical line 22 and along an inclined line 22*a*. The expression "substantially upright" is used hereinafter to describe a vertical line or a line somewhat inclined from the vertical but not to the extent that the liquid droplets fall laterally therefrom.

The lower ends of the lines which pass through the holes 18, 19 and 20 may be fixed in position by forming a knot on the lower side of the annular plate 21, the knot being larger than the hole through which the line passes. Liquid passes from the upper surface of the annular plate 21 through the holes 18, 19 and 20 and also through other holes 29 into the annular liquid reservoir 30. An electrically driven pump 31 circulates liquid from the reservoir 30 through the filter 32, discharge tube 33, valve 34 up through the interior of one of the support pipes 11 and into the liquid distributor through port 35. The liquid passes above the horizontal plate 18 within the distributor 10 and thus through the clearance spaces between each line and the hole in the plate 18 through which it extends. The liquid then descends by droplets along the lines in each of the series. Thus the droplets on the inner series of lines passing through holes 15 and 18 give the appearance of a swirling descending motion in one direction, while the droplets on the lines passing through holes 16 and 19 appear to swirl in the opposite direction. The droplets on the vertical lines 22 provide an enclosing sheath which does not appear to swirl. The individual droplets act as tiny lenses to catch the light and appear to sparkle and twinkle as they descend, like slowly falling rain.

The ornamental effect is heightened by employing fluorescent material in the liquid and by employing a light source 36 which emits rays of light rich in the spectrum of the ultra-violet to cause the descending droplets to fluoresce. Another light source 36*a* is preferably incandescent with a color filter. The light sources are mounted centrally of the collector 14 and the distributor 10.

If desired, the collector 14 may be filled with aluminum wool or stainless steel wool to prevent dripping sounds, and the collector may be encircled by an annular planter box 37 for additional decorative effect.

The liquid employed may contain other additives; for example, insecticides or insect repellants as well as perfumes or fragrances.

While water may be used as the liquid to form the droplets, it has been found that triethylene glycol, which is colorless but of greater viscosity than water, is better suited for the purpose. Furthermore, triethylene glycol does not readily evaporate in air. The size of the droplets and their speed of descent depends upon the particular liquid employed, the thickness of the lines, the size of the openings in the bottom wall 18 of the distributor 10 and the hydraulic head in the distributor. The droplets do not descend at precisely the same rate and hence a rather striking ornamental effect is produced. The valve 34 may be adjusted to control the desired depth of liquid in the distributor 10 and thus control the size of the descending droplets.

The triethylene glycol will absorb moisture from the air if the air is damp and will return it if the air is dry. The ornamental device, with its large surface area, may thus be used to modify the humidity of the air by adding water to the distributor or collector.

In the modification shown in FIGURES 4, 5, 6 and 7 two horizontal parallel liquid distributors 40 and 41 are employed and the lines or wires which extend from them are connected at their lower ends to two parallel collectors 42 and 43 in the form of open-top troughs. The lines 44 are parallel and are of the same type previously described.

FIGURE 18 shows a preferred means for securing the lines 44 to the horizontal distributor 40. Each line extends through an opening 45 in the lower portion of the distributor and also extends through an opening 46 in the upper portion thereof. Each line extends through a pierced opening in a soft plastic bead 47 and a knot 48 in the line is formed which compresses the bead to seal about the line when tension is applied.

FIGURE 19 shows a preferred means of anchoring the lower ends of the lines 44 to the collector 42 and, as shown, metal straps cut from the collector serve as anchors for the lower ends of the lines and hold them in proper spacing. The distributors 40 and 41 are supported at the upper ends of vertical posts 50 and 51 provided with contact elements 52 and 53 for engagement with the floor and ceiling of a room. The posts 50 and 51 are also secured to the collectors 42 and 43 into the liquid reservoirs 54 and 55.

The lines 44 are contained in a vertical plane and the lines 56 which extend from the distributor 41 to the collector 43 are substantially contained in a parallel vertical plane. The lines 56 are not vertical or parallel, however, but, on the contrary, the upper portion of each line 56 above the intermediate member 57 is inclined in one direction and the lower portion of the same line is inclined in the opposite direction. The intermediate member 57 has a collector chamber 58 and a distributor chamber 59 separated by a fine mesh screen 57*a*. The intermediate member 57 is parallel to the distributors 40 and 41 and to the collectors 42 and 43 and is placed midway between them in symmetrical fashion. The intermediate member 57 is only about half as long as the distributors 40 and 41, however, and in order to preserve the required minimum spacing between the lines, three series of apertures 60, 61 and 62 are provided in the collector plate 63 and in the distributor plate 64. The degree of lateral offsetting of the series of apertures 60 and 62 from the central series 61 is exaggerated in the drawings for clarity of illustration, and from a short distance away, the fact that the lines 56 are not strictly in the same plane in the region of the intermediate member 57 is not noticeable. The intermediate member is supported on the lines 56 and has no other support. If desired, an ornamental bow 65 may be mounted on the intermediate member to produce the illusion that the fabric material of the bow has constricted the center portion of the series of lines 56.

Two separate motor-operated pumps 67 and 68 are provided. One pump 67 delivers liquid from the reservoir 54 through a filter to the liquid distributor 41 through a tube 69 mounted within the post 50. Similarly, the other pump 68 delivers liquid from a filter through tube 70 mounted within the other post 51 to the distributor 40. Two separate liquid systems are thus employed. Aluminum wool or stainless steel wool may be placed in the reservoirs 54 and 55 to eliminate any dripping sound. The fluorescent material in the liquid descending on lines 44 from the distributor 40 may be of one color. The same light source 71 emitting ultra-violet light is directed to illuminate both liquid systems and hence the droplets descending on the vertical lines 44 appear to be of one color, while the droplets descending on the lines 56 appear to be of another color.

Figures 4, 5, 6, 7:
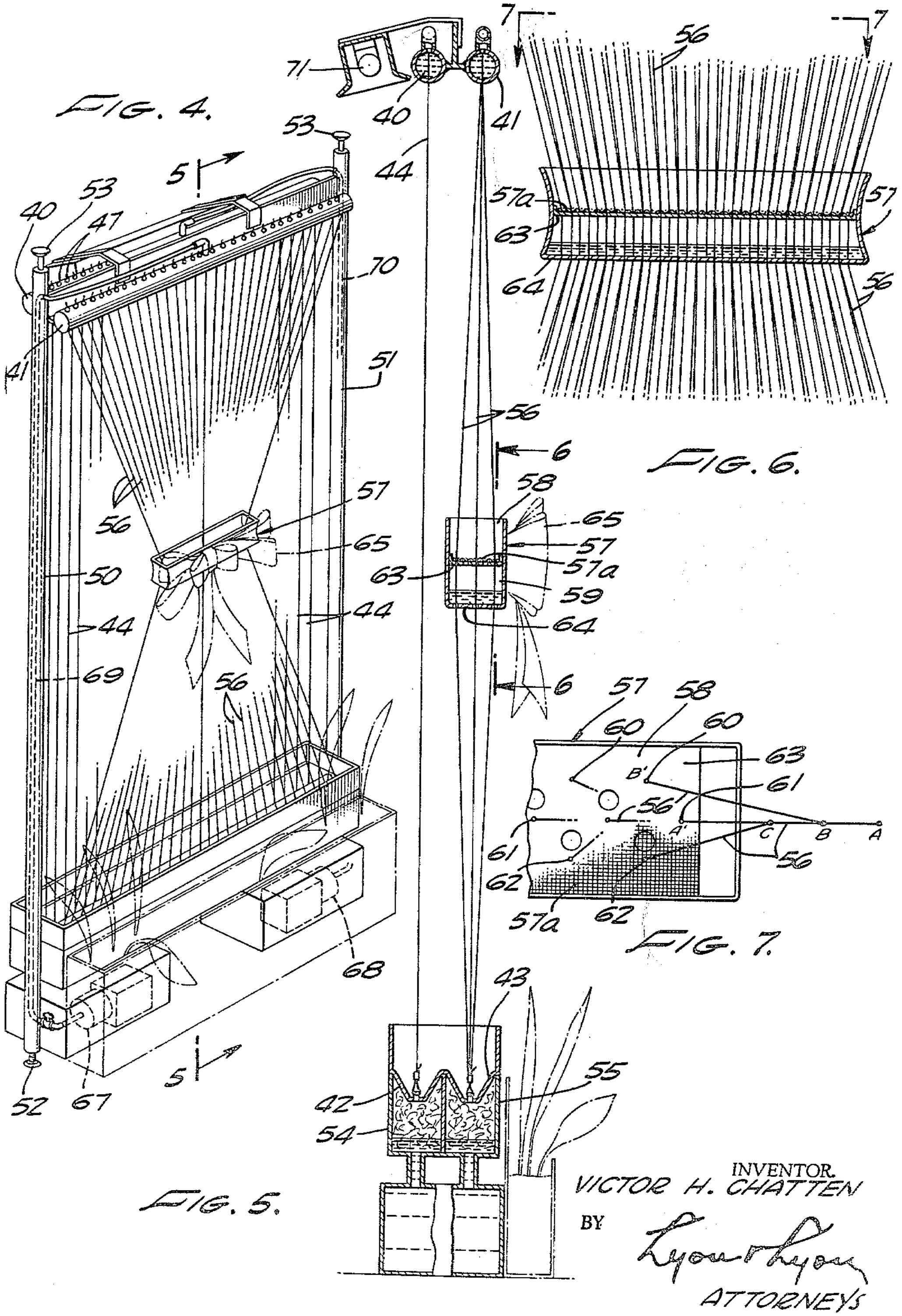
FIGURE 4 is a perspective view showing a modified form of the device.
FIGURE 5 is a sectional elevation taken substantially on the lines 5—5, as shown in FIGURE 4.
FIGURE 6 is a sectional front elevation taken substantially on the lines 6—6, FIGURE 5.
FIGURE 7 is a plan view partly broken away, taken in the direction of the lines 7—7, as shown in FIGURE 6.

In other respects, the ornamental device of FIGURE 4 operates in a manner similar to that previously described.

Figures 8, 9, 10, 11, 21, 22:
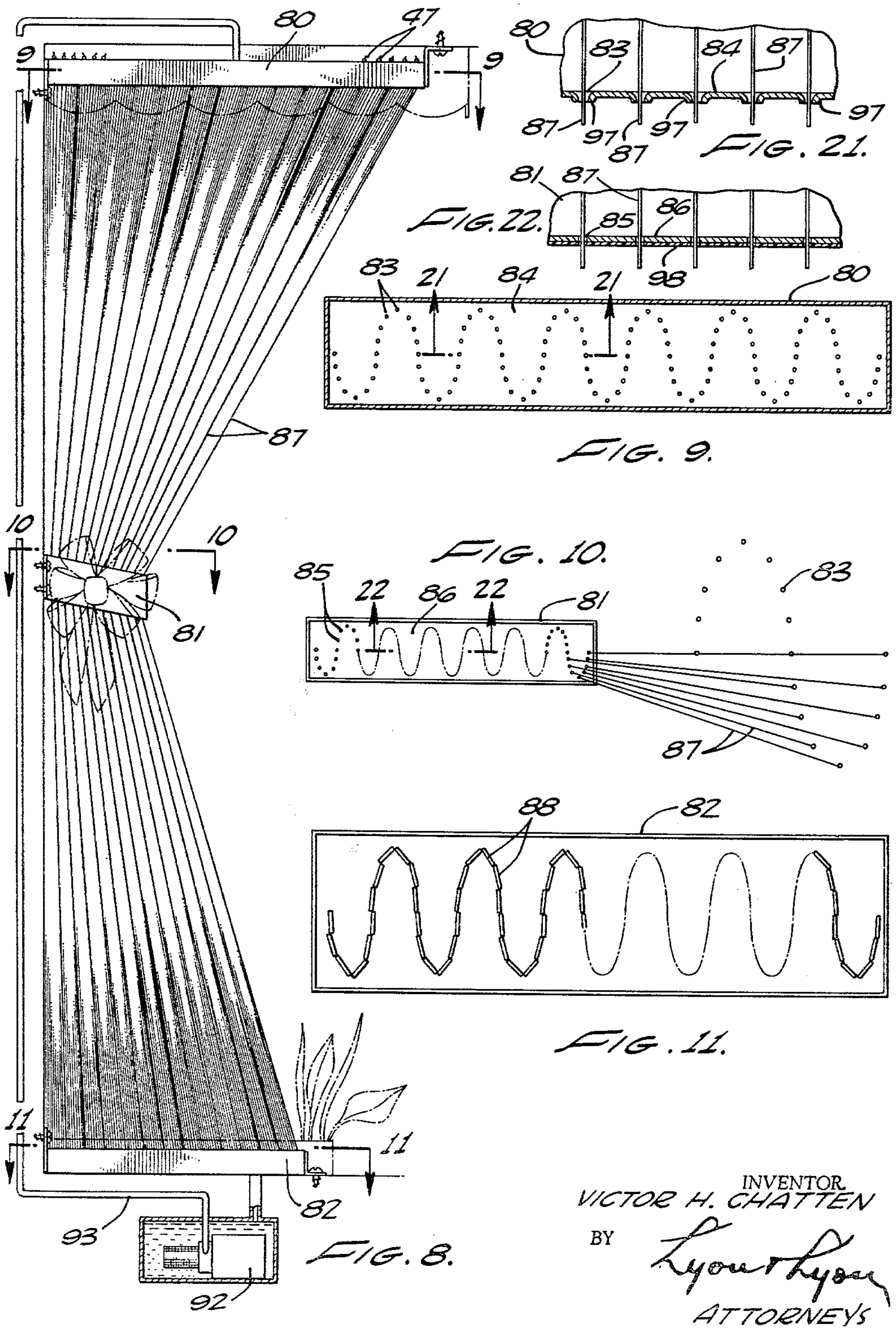
FIGURE 8 is a side elevation showing a second modification.
FIGURES 9, 10, 11 are transverse sectional views taken substantially on the lines 9—9, 10—10 and 11—11 as shown in FIGURE 8.
FIGURE 21 is a fragmentary sectional elevation taken substantially on lines 21—21 as shown on FIGURE 9.
FIGURE 22 is a fragmentary sectional elevation taken substantially on lines 22—22 as shown on FIGURE 10.

In the modified form of the device shown in FIGURES 8, 9, 10 and 11, the distributor 80, intermediate member 81 and collector 82, are horizontal and parallel and are mounted in vertically spaced relationship. The holes 83 in the bottom wall 84 of the distributor 80 are laid out in a sinusoidal pattern as best shown in FIGURE 9. The apertures 85 in the bottom wall 86 of the short intermediate member 81 are laid out in the same pattern although closer together. A preferred method of anchoring the lower ends of the lines 87 to the collector 82 is shown in FIGURE 20 wherein adjacent metal tabs 88 are bent in opposite directions from an upstanding flange 89 to clamp adjacent lines in position and to anchor them in a sinusoidal pattern as shown in FIGURE 11. Flange 89 may be fixed to the collector 82 by any convenient means such as by spot welding 90.

The distributor 80 is attached to the ceiling and the intermediate member 81 is supported by the wall 91. The lines 87 extend through the holes 83 and apertures 85 in the manner described above so that liquid delivered into the distributor 80 by means of the motorized pump 92 and pipe 93 descends in droplets by gravity along the lines 87. The configuration of the lines as formed by the sinusoidal pattern produces the effect of a curtain drawn to one side at a mid-position. This effect may be heightened by means of a fabric bow 94 mounted on the intermediate member 81.

Means are provided for insuring that droplets do not adhere to the underside of the distributor 80 or the intermediate member 81. As shown in FIGURE 21, the bottom wall 84 of the distributor 80 is depressed in a shallow ring 97 around each opening 83. This construction effectively prevents liquid from passing through the openings 83 and adhering to the underside of the bottom wall 84 and then collecting around a line 87 extending through one of the other openings. The same result is achieved by means of the construction shown in FIGURE 22 wherein the bottom wall 86 of the intermediate member 81 is provided with a coating 98 on the underside thereof to prevent liquid droplets from adhering thereto. A coating of Teflon has been found to be satisfactory and effectively prevents droplets from passing from one opening 85 along the underside of the bottom wall 86 to descend around a line 87 projecting through another opening. The coating 98 may be formed of any material which is not readily wet by the liquid droplets.

In the modification of FIGURE 23, the distributor 101 takes the form of a tube ascending in spiral fashion with continuously decreasing diameter. The upper end of the tube 101 is supported by a central vertical post 102. Openings 103 are formed at regular intervals along the lower portion of the spiral tube and a vertical line 104 extends through each opening 103 down to an anchoring clip 105 contained within the spiral collector 106. Each line 104 may be secured to the tube 101 by means of a plastic bead 107 and knot 108, as previously described. Liquid from a reservoir 109 passes through a filter 110 and is raised through the central tubular post 102 by means of the motor driven pump 111. A valve, not shown, may control the rate of flow through the hollow post 102 in order that liquid may flow through the distirbutor 101 at the proper rate to supply each of the vertical lines 104. At its lower end, the tube 101 is connected to the spiral collector 106.

In the modified form of the invention shown in FIGURES 27 and 28, the lines 115 carrying liquid droplets extend from an annular distributor 116 to an annular collector 117 but the lines are not straight for their full length. Instead each line is laterally engaged by a very small diameter guy wire 118. It has been found that if the guy wire 118 is of much smaller diameter than the droplet-carrying line 115 and if the guy wire 118 extends laterally from the line 115 that substantially no interference is caused with the droplets which descend along the line 115. FIGURE 28 shows how the guy wires 118 may be formed from a continuous length of small diameter wire of any suitable material. The guy wire 118 passes alternately around one of the droplet carrying lines 115 and around a horizontal metal ring 119. The result is that each of the droplet carrying lines 115 is inclined in one direction above the level of the ring 119 and inclined in a different direction below it. Since the droplets 120 tend to gravitate to the lower side of the line 115 as they descend, the major portion of each droplet above the level of the ring 119 appears on one side of each line 115 while the major portion of each droplet below the ring 119 appears on the other side of the same line 115.

FIGURES 30 and 31 are diagrams showing how the guy wires 121 may be applied laterally to a liquid-carrying line 122 to cause it to have a zig-zag form, and how guy wires 123 may be applied to a liquid carrying line 124 to cause it to curve as desired. In each case, the guy wires are much smaller in diameter than the line which carries the liquid droplets and the guy wires extend essentially laterally from the line.

It has been found that an interesting pulsation effect can be achieved by forming the distributor as a closed chamber. The pulsing of the motor driven pump is then reflected in small periodic changes in pressure within the distributor with the result that the droplets emerging on the lines from the distributor are formed at substantially the same instant, and most of the droplets appear to start their descent at the same time. This pulsating effect may be accentuated or minimized at will by means of an adjustable choke valve applied to a stand pipe on the distributor. When the valve is fully open, substantially uniform flow of droplets occurs. When the valve is closed, a full pulsation effect is achieved.

Having fully described my invention, it is to be understood that I am not to be limited to the details herein set forth, but that my invention is of the full scope of the appended claims:

I claim:

1. In an ornamental device of the type described, the combination of: a liquid distributor having a series of holes in a bottom portion thereof, a liquid collector positioned below said distributor, a series of lines extending between said distributor and collector and projecting through said series of holes, each hole being larger than the line passing therethrough, means for maintaining each of the lines under tension, and means for delivering a liquid to said distributor, whereby the liquid may pass through the clearance spaces and descend by gravity in droplets along the series of lines and be received in said collector.

2. The device of claim 1 in which the liquid distributor is horizontal and in which the liquid collector comprises an open-top trough.

3. The device of claim 1 in which the liquid is triethylene glycol.

4. The device of claim 1 in which monofilament nylon lines are employed.

5. The device of claim 1 in which the liquid contains fluorescent material, and means are provided for lighting the droplets with ultraviolet light.

6. The device of claim 1 in which the lines are substantially vertical.

7. The device of claim 1 in which the lines are inclined.

8. The device of claim 1 in which a liquid level is maintained in the collector and wherein the lower end of each of the lines extends below said liquid level.

9. The device set forth in claim 1 having two series of lines, each series lying substantially in a vertical plane, one plane being adjacent and parallel to the other.

10. The device set forth in claim 1 having two series of lines, each series lying substantially in a vertical plane, one plane being adjacent and parallel to the other, means for delivering liquid containing a fluorescent material to one series of lines, means for delivering a liquid containing a different fluorescent material to the other series of lines, whereby the two liquids may descend in droplets by gravity along the two series of lines, and common means for lighting the droplets with ultraviolet light.

11. The device set forth in claim 1 wherein a central hollow post is provided and wherein the liquid distributor comprises a spiral distributor pipe descending from the post.

12. In an ornamental device of the type described, the combination of: a horizontal annular liquid distributor having a circular series of holes in a bottom portion thereof, an annular liquid collector positioned therebelow, a plurality of substantially upright lines each projecting through one of said holes respectively, and each extending into said annular liquid collector, each hole being larger than the line passing therethrough to provide clearance space around the line, means for delivering a liquid to said annular distributor whereby liquid in said annular distributor may pass through the clearance spaces and descend by gravity in droplets along said lines and be received in said annular collector, and means for maintaining each of the lines under tension.

13. In an ornamental device of the type described, the combination of: a horizontal liquid distributor having two concentric series of holes in a bottom portion thereof, a liquid collector positioned below said distributor, two series of lines extending between the distributor and the collector, a first series of lines projecting through the inner series of holes and the second series of lines projecting through the outer series of holes respectively, each hole being larger than the line passing therethrough to provide clearance space around the line, the lower ends of both series of lines being fixed with respect to the collector, and means for delivering a liquid to said annular distributor, whereby the liquid may pass through the clearance spaces and descend by gravity in droplets along both series of lines and be received in said annular collector, and means for maintaining each of the lines under tension.

14. In an ornamental device of the type described, the combination of: a horizontal liquid distributor having two series of holes in a bottom portion thereof, a liquid collector positioned below said distributor, two series of inclined lines extending between the distributor and the collector, a first series of lines projecting through a first series of holes and the second series of lines projecting through a second series of holes respectively, each hole being larger than the line passing therethrough to provide clearance space around the line, the lower ends of both series of lines being fixed with respect to the collector, the lines in the first series being inclined in one direction and the lines in the second series being inclined in another direction, means for delivering a liquid to said distributor whereby the liquid may pass through the clearance spaces and descend by gravity in droplets along both series of inclined lines and be received in said collector, and means for maintaining each of the lines under tension.

15. In an ornamental device of the type described, the combination of: a horizontal annular liquid distributor having two concentric series of holes in a bottom portion thereof, an annular liquid collector positioned vertically below said distributor, two series of inclined lines extending between the distributor and the collector, a first series of lines projecting through the inner series of holes and the second series of lines projecting through the outer series of holes respectively, each hole being larger than the line passing therethrough to provide clearance space around the line, the lower ends of the first series of lines being fixed in a circular pattern with respect to the collector, the lower ends of the second series of lines being fixed in a larger circular pattern with respect to the collector, the lines in the first series being inclined in one direction and the lines in the second series being inclined in the other direction, and means for delivering a liquid to said angular distributor, whereby the liquid may pass through the clearance spaces and descend by gravity in droplets along both series of inclined lines and be received in said annular collector, and means for maintaining each of the lines under tension.

16. In an ornamental device of the type described, the combination of: a horizontal liquid distributor having a series of holes in a bottom portion thereof, a liquid collector positioned below said distributor, a series of inclined lines extending between the distributor and the collector and projecting through said series of holes, an intermediate member positioned between the distributor and the collector and contacting the lines to change the inclination of each line, each hole being larger than the line passing therethrough to provide clearance space around the line, the lower ends of the lines being fixed with respect to the collector, means for delivering a liquid to said distributor, whereby the liquid may pass through the clearance spaces and descend by gravity in droplets along the inclined lines to the intermediate member and then along the inclined lines to be received in said collector, and means for maintaining each of the lines under tension.

17. In an ornamental device of the type described, the combination of: a horizontal liquid distributor having a series of holes in a bottom portion thereof, a liquid collector positioned vertically below said distributor, a series of inclined lines extending between the distributor and the collector and projecting through said series of holes, an intermediate member positioned symmetrically between the distributor and the collector and contacting the lines to reverse the inclination of each line respectively, each hole being larger than the line passing therethrough to provide clearance space around the line, the lower ends of the lines being fixed with respect to the collector, and means for delivering a liquid to said distributor whereby the liquid may pass through the clearance spaces and descend by gravity in droplets along the inclined lines to the intermediate member and then along the inclined lines to be received in said collector.

18. In an ornamental device of the type described, the combination of: a horizontal liquid distributor having a linear series of holes in a bottom portion thereof, a liquid collector positioned vertically below said distributor, a series of inclined lines extending between the distributor and the collector and projecting through said series of holes, an intermediate member positioned symmetrically between the distributor and the collector, said member being shorter than the distributor and having an open-top trough into which the lines extend, said intermediate member also having a bottom wall provided with parallel series of holes through which the lines extend, each hole in the distributor and in the intermediate member being larger than the line passing therethrough to provide clearance space around the line, the lower ends of the lines being fixed with respect to the collector, the portion of each line above the intermediate member being inclined in one direction and the portion of each line below the intermediate member being inclined in another direction, and means for delivering a liquid to said distributor whereby the liquid may pass through the clearance spaces and descend by gravity in droplets along the inclined lines from the distributor to the intermediate member and from the intermediate member to the collector.

19. In an ornamental device of the type described, the combination of: a horizontal liquid distributor having a series of holes in a bottom portion thereof, the holes being arranged in a general curvilinear pattern, a liquid collector positioned below said distributor, a series of lines extending between the distributor and the collector and projecting through said series of holes, an intermediate member positioned between the distributor and the collector and having a portion thereof provided with apertures through which the lines extend, said apertures being arranged in a curvilinear pattern similar to that of the holes in the distributor, each line having a portion extending between the distributor and the intermediate member at one inclination, each line having another portion extending from the intermediate member to the collector at another inclination, each hole and each aperture being larger than the line passing therethrough to provide clearance space around the line, means securing the lower ends of the lines with respect to the collector to maintain the lines in tension, and means for delivering a liquid to said distributor whereby the liquid may pass through the clearance spaces and descend by gravity in droplets along the lines from the distributor to the intermediate member and from the intermediate member to the collector.

20. In an ornamental device of the type described, the combination of: a horizontal liquid distributor having a series of holes in a bottom portion thereof, the holes being arranged in a generally sinusoidal pattern, a liquid collector positioned vertically below said distributor, a series of lines extending between the distributor and the collector and projecting through said series of holes, an intermediate member supported on the lines and positioned between the distributor and the collector and having a portion thereof provided with apertures through which the lines extend, said apertures being arranged in a sinusoidal pattern similar to that of the holes in the distributor, each line having a portion extending between the distributor and the intermediate member at one inclination, each line having another portion extending from the intermediate member to the collector at another inclination, each hole and each aperture being larger than the line passing therethrough to provide clearance space around the line, means in the same sinusoidal pattern securing the lower ends of the lines with respect to the collector to maintain the lines in tension, and means for delivering a liquid to said distributor whereby the liquid may pass through the clearance spaces and descend by gravity in droplets along the lines from the distributor to the intermediate member and from the intermediate member to the collector.

21. In an ornamental device of the type described, the combination of: an annular liquid distributor having a series of holes in a bottom portion thereof, an annular liquid collector positioned below said distributor, a series of lines extending between said distributor and collector and projecting through said series of holes, each hole being larger than the line passing therethrough, means for maintaining each of the lines under tension, said means including a ring encircling the series of lines and positioned between the distributor and the collector, guy wires extending from said ring to each of said lines so that the portion of each line above the ring is inclined in one direction and the portion below the ring is inclined in another direction, and means for delivering a liquid to said distributor, whereby the liquid may pass through the clearance spaces and descend by gravity in droplets along the series of lines and be received in said collector.

References Cited by the Examiner

UNITED STATES PATENTS

| | | | |
|---|---|---|---|
| 919,157 | 4/09 | Glaser | 239—20 |
| 1,044,969 | 11/12 | Arndt | 47—38.1 |
| 1,952,353 | 3/34 | Barclay | 239—20 X |
| 2,526,546 | 10/50 | Dowsing | 40—106.21 |
| 2,531,002 | 11/50 | Sisk et al. | 40—106.21 |
| 2,748,257 | 5/56 | Bennett | 240—10 |
| 3,098,611 | 7/63 | Connell | 240—10 |

FOREIGN PATENTS

| | | |
|---|---|---|
| 4,192 | /05 | Great Britain. |

EVERETT W. KIRBY, *Primary Examiner.*

NORTON ANSHER, LOUIS J. DEMBO, *Examiners.*